June 11, 1940.  J. W. FORRESTER  2,204,211
DEVICE FOR HANGING TRIP LINE CORNER BLOCKS
Filed Aug. 9, 1938  3 Sheets-Sheet 1

June 11, 1940.  J. W. FORRESTER  2,204,211
DEVICE FOR HANGING TRIP LINE CORNER BLOCKS
Filed Aug. 9, 1938  3 Sheets-Sheet 2
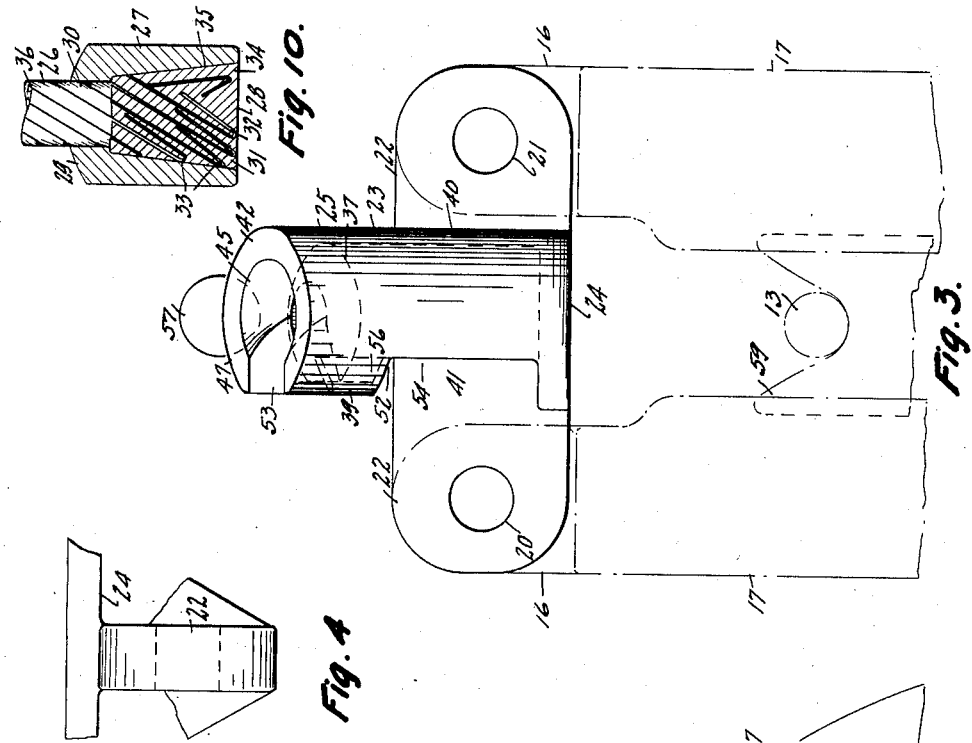
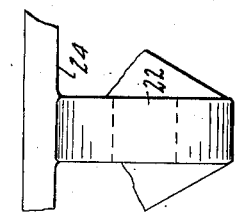
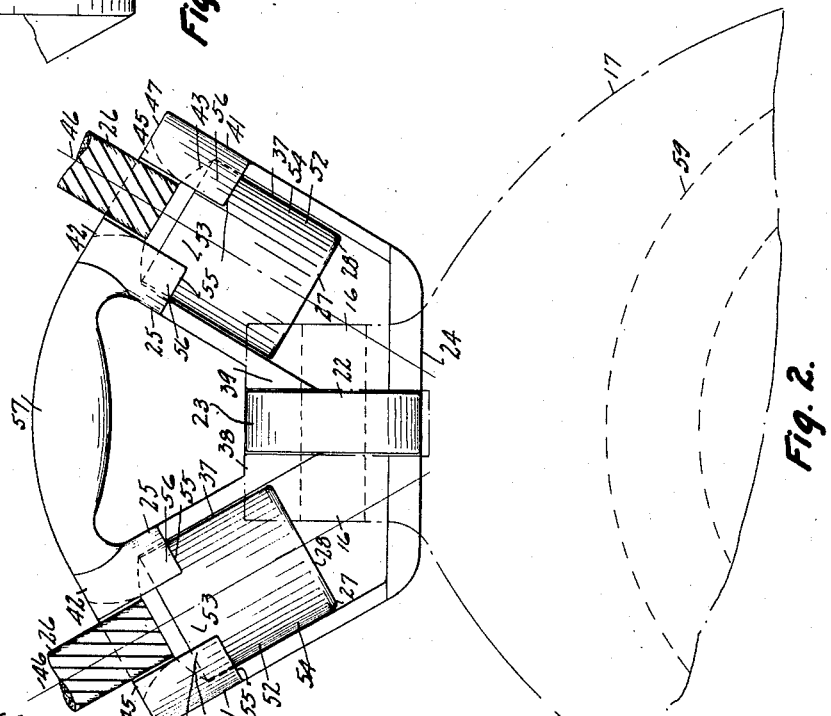

June 11, 1940.  J. W. FORRESTER  2,204,211

DEVICE FOR HANGING TRIP LINE CORNER BLOCKS

Filed Aug. 9, 1938  3 Sheets-Sheet 3

Witnesses:
Mary D. Stack
Emmet G. Stack

Jesse W. Forrester
Inventor

Patented June 11, 1940

2,204,211

UNITED STATES PATENT OFFICE 2,204,211

DEVICE FOR HANGING TRIP LINE CORNER BLOCKS

Jesse W. Forrester, Marshfield, Oreg.

Application August 9, 1938, Serial No. 223,834

3 Claims. (Cl. 254—194)

My invention relates to an improved device for hanging logging blocks and the like in which the pull upon them is principally outward, for instance, as upon trip line corner blocks.

Some of the objectives of this invention correspond to those set forth in Patent No. 1,996,509, issued to me on April 2, 1935, for a device for hanging logging equipment upon which the pull is principally downward. These similar objectives are: the saving of the wire rope used in running the spliced eyes of the strap and the time incident thereto; the elimination of the splicing specialist from the payroll; the elimination of injuries due to contact with the jaggers of a splice; the elimination of wear due to chafing of the spliced eyes; and many others which I shall mention as I come to them in the detailed description.

Figure 1:
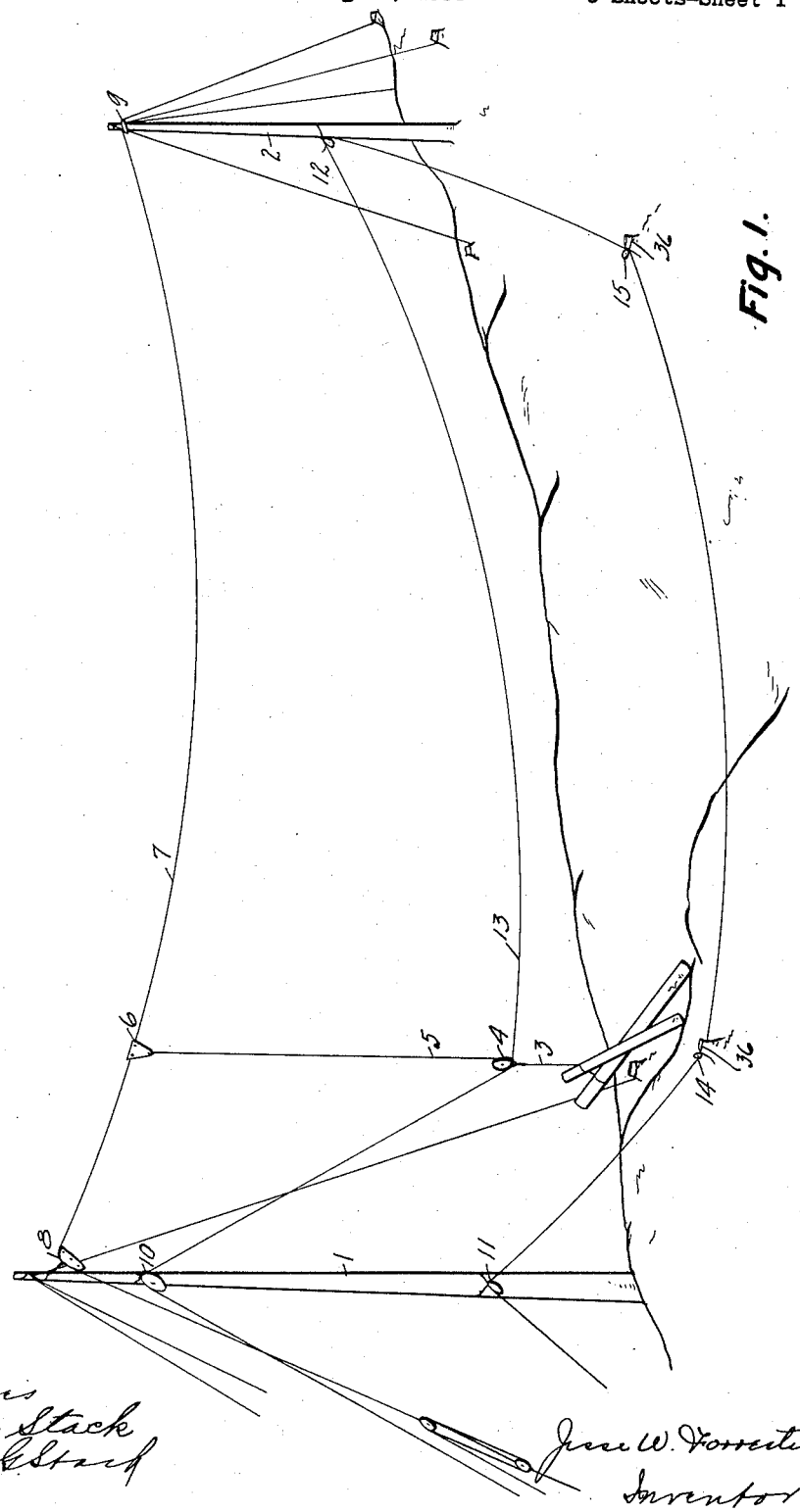
Figure 8:
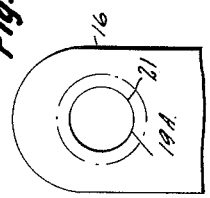
Figure 9:
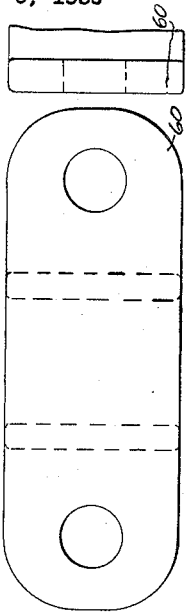
Figure 7:
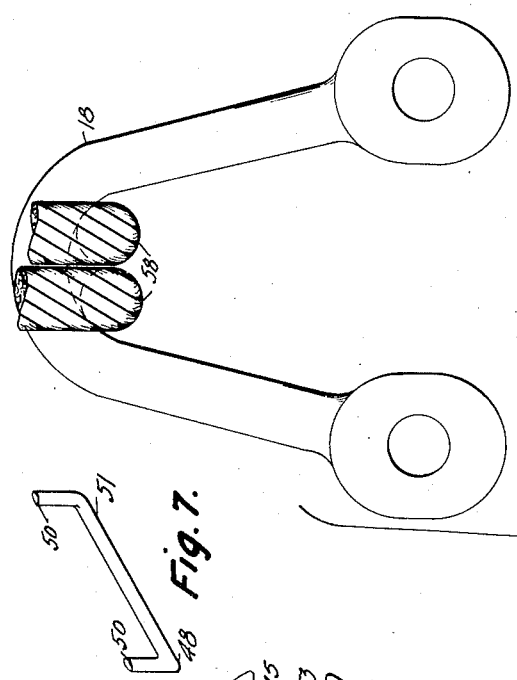
Figure 6:
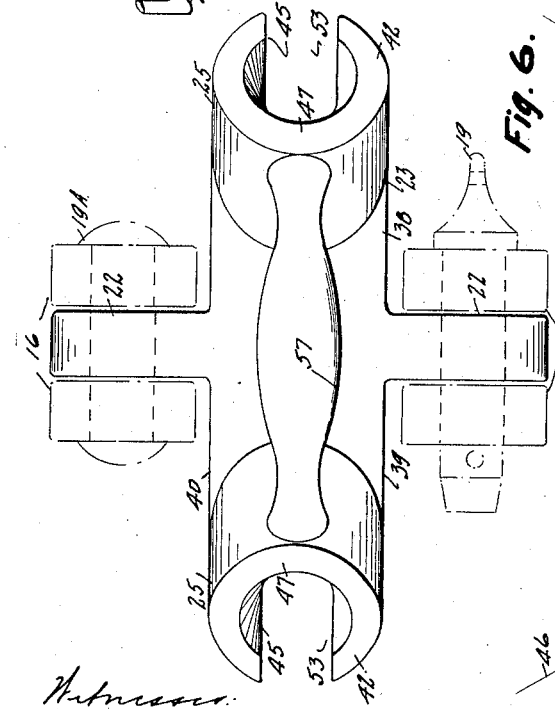
Figure 5:
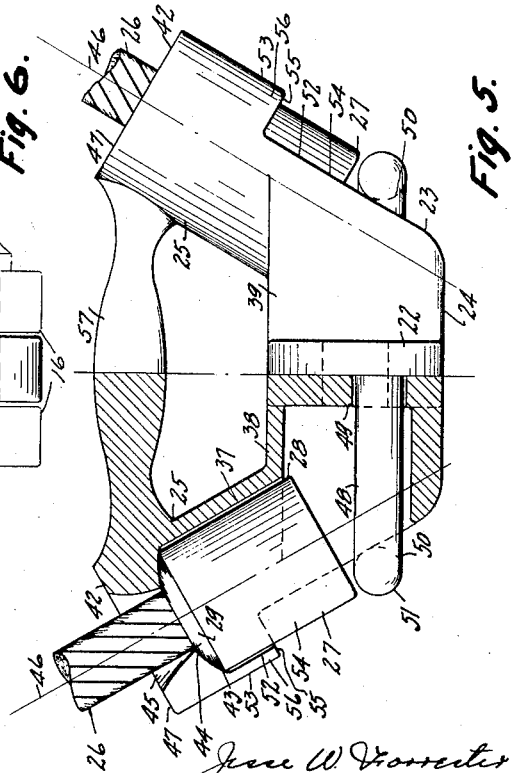

Fig. 1 of the drawings shows the general arrangement of the "North Bend" system of logging; Fig. 2 is a plan view of an open-sided interconnection; Fig. 3 is an end view of Fig. 2; Fig. 4 is a partial plan view of an interconnection having a depending crosshead; Fig. 5 is a plan view of an open-ended interconnection; Fig. 6 is a top view of Fig. 5; Fig. 7 is a perspective of the keeper shown with the interconnection in Fig. 5; Fig. 8 is a partial end view of a guard now in general use; Fig. 9 shows a disassembled view of the elements used and as arranged in the prevailing method of hanging a corner block; Fig. 10 is a section on the median line of a thimble.

Thruout the drawings and the specification similar numerals refer to similar parts.

I have used the "North Bend" system of logging to show equipment employing both types of hanging devices. The spar tree 1 is usually located at a loading or swing point, and the tail tree 2 at a point two thousand or more feet distant. Logs lying on the road between them are hauled in by the chokers attached to the fall block 4 riding in the bight of the main line 5 attached to the carriage 6 adapted to ride upon the skyline 7 supported upon the spar tree 1 by the tree jack 8 and upon the tail tree 2 by the tree shoe 9. The main line 5 is supported at the spar tree 1 by the high lead block 10 positioned to lead the main line in the most efficient manner to its donkey drum (not shown). In a like manner the head trip line blocks 11 and 12 support the trip line 13 at the spar and tail trees respectively. The trip line 13 is attached to the fall block 4 and is shown guided to its donkey drum (not shown) by the head trip line blocks 11 and 12 and the corner blocks 14 and 15. From Fig. 1, it is to be seen that the pull upon the tree jack, the tree shoe, and the high lead block, is principally downward, and that the pull upon the corner blocks is principally outward.

The trip line corner blocks are usually secured to an anchorage such as a stump or tree (see Fig. 1) by means of an encircling wire rope strap having spliced eyes on each end which are threaded upon a clevis attached to a block. Fig. 9 shows the prevailing arrangement and with Fig. 1 is particularly pertinent to the remainder of this paragraph. When there is a strain on the trip line, the corner block is raised and held in a substantially horizontal position, but drops, due to gravity, when the strain is removed. As a consequence, there is a constant hinged action taking place between the several parts of the hanging equipment which causes considerable chafing between the parts. Between the eye and the clevis this chafing is magnified because one eye is positioned over the other because the clevis is positioned at right angles to the trip line sheave. This positioning of the eye throws the block in a twist and prevents it from readily aligning itself to the lead of the trip line. As a result, the trip line very frequently pulls over the block sides thereby cutting and scoring them as well as cutting itself. It is very evident that when a new trip line is used with blocks having scored sheaves or sides, the line is quickly ruined or its life shortened. Trip lines several thousand feet long cost money and lots of it, and it is one of the further objects of this invention to provide a hanging device in which the articulation is taken at the end of a thimble on the strap ends thereby eliminating the chafing of the strap and permitting the ready adjustment of the block to the lead of the trip line thereby preventing the scoring of the block and incidently the the trip line.

The regular block of the trip line type is built with a pair of ears 16 formed on one end of each block side 17 thru which a hinge pin is passed to secure the regular clevis 18 which I am superceding with my interconnection A. The corner blocks of a setting are frequently changed, and since the trip line is removed from the block each time, one of the pins as 19 is made to be removed while the pin 19A is generally fixed.

My interconnection A may be attached to a block similar to a clevis, or as shown in Figs. 2 and 3, using the same hinge pin 19A and the same removable pin 19. These pins 19 and 19A pass thru the holes 20 and 21, respectively, provided for them in the crosshead 22 which, in Figs. 2 and 3, is shown as an elongated rectangular section extending at right angles from the sides of the lower tie member 23 of the interconnection A, or depending from the bottom 24 of said tie member 23 and at right angles thereto as shown in Fig. 4. In both of the plan views shown in Figs. 2 and 5, the interconnection A and incidentally its tie member 23 are both shown to have a V-shaped configuration whereby the diverging portions 25 thereof are in substantially tangential alignment with the sides of a stump or tree of average diameter, say 24", when the interconnection is closely attached to said stump or tree thru the agency of a strap 26. It may be pointed out that the interconnection A does not have to be closely attached. The straps 26 are usually made long enough to make connections to any tree or stump that may be encountered and desirable.

Wire ropes with thimbled ends are extensively used in connection with certain types of choker and butt hooks, and even thimbles having integral eyes are in use. The method of preparing, cleaning, and anchoring the thimble on the wire rope is so well known to the logging fraternity that I shall only briefly describe Fig. 10, in which I show only a few of the wires and their anchoring. Most of the thimbles used in connection with choker and butt hooks have flat ends, which I may use, but I prefer to use the type shown in Fig. 10. The thimble 27 is cylindrical in form and has one flat end 28 and one convex end 29 which is pierced by a centrally positioned aperture 30 thru which the end of the rope is passed into the frusto-conically shaped chamber 31 whose base is the end 28. Some loggers merely untwist and spread the wires 32 which form the wire rope strap 26, but I prefer to bend the wires 32 back upon themselves as I have shown. The ends of the wires 32 or their bends 33 should be short of the thimble end 28. After the wires have been dipped in sulphuric acid to clean them, and after the surplus acid is cleaned off with clean water, the interstices 34 between them are filled with lead, zinc, or babbitt, poured in while hot so as to form a solid frusto-conically shaped head 35 on the wire rope in conformity with the chamber 31.

I prepare my strap 26 by securing or socketing a thimble 27 on each end 36 of a predetermined length of wire rope. Such a strap is free from jaggers common with spliced eyes. No matter what strains come upon the wire rope strap the thimbled ends 36 thereof are readily aligned, without facing up, to their respective associated parts of the portions 25 because of their continuous cylindrical form.

The portions 25 are cylindrical in form as is the chamber 37 formed therein for the reception of the cylindrically-shaped thimble 27. These portions 25 are positioned above and are merged with the lower tie member 23 which has a bottom 24, a top 38, sides 39 and 40, and ends 41. The top end 42 of a portion 25 is made of adequate thickness for strength and to permit the seat 43 for the convex end 29 of the thimble 27 to be adequately formed on its inner face 44. Each of the ends 42 is pierced by an aperture 45 whose median line 46 is tangent with the side of the stump or tree mentioned but not shown. The aperture 45 is flared outwardly to the face 47 and is slightly relieved where it merges into the seat 43. In Figs. 2 and 3, the chamber 37 is entered relative to the side wall 39, and in Figs. 5 and 6, it is entered relative to the ends 41 of the lower tie member 23.

Whether said entrance is relative to the side wall 39 or to the ends 41, depends upon the preference of the user. Each way has an advantage which I shall now discuss. In Fig. 2, it will be noticed that the thimbled ends 36 are behind the ears 16 of the block when the thimble end 29 is bearing against its seat 43. Such an instance requires that the interconnection A be thrown back on its hinge pin 19, as when removing the trip line 13 from the block, in order to remove either of the thimbled ends 36 from the chambers 37 because the block's ears 16 prevent their removal otherwise, thus a keeper is dispensed with. In Figs. 5 and 6, where the entrance to the chamber 37 is relative to the ends 41, the thimbled ends 36 are readily removed from said chambers without opening up the block. To prevent other than manual removal, I have provided the keeper shown in Fig. 7, which is merely a round rod formed as shown. The body portion 48 passes thru the hole 49 in the crosshead 22 which forms a division wall between the chambers 37. The ends 50 of the keeper 51 are turned down sufficiently to make it necessary to turn the keeper until the position of its ends 50 will permit the keeper to be moved endwise from under a thimble 27.

The entrance to a chamber 37 is thru a T-shaped slot 52 whose narrow portion 53 merges with the aperture 45. This narrow portion 53 is made wide enough to permit the wire rope to be passed thru sidewise, while the wider portion 54 is also made to permit the thimble 27 to be passed thru sidewise. The face 55, formed at the junction of the narrow and wide portions of the T-shaped slot 52, is positioned to form the shoulders 56 which serve to retain the thimble 27 within the chamber 37. The seat 43 is given the same curvature as the convex end 29 of the thimble 27 but it is made deeper and hence of greater diameter than said convex end 29 which permits the thimble 27 to adjust itself to the lead of the strap ends 36 and maintain its maximum bearing area. It is evident from the above that a corner block may be attached to a stump or tree of much greater or much smaller diameter than the average mentioned without the wire rope of the strap 26 coming into contact with the sides of the aperture 45.

The corner blocks, sometimes called side blocks when several are used along a long run, are usually positioned in different horizontal planes in an ordinary setting and hence each must adjust itself to blocks on either side. The spliced-eye straps now used become kinked and when moved to a new location, which they constantly are, they are kinked some more and new rubbing surfaces are presented for chafing. The use of my interconnection A permits the constant changing of the blocks from one position to another without damage to the strap, or the trip line. To facilitate moving the blocks about, I have provided the hand grip 57 which serves as a spreader also to hold the spacing of the diverging portions 25.

In the first part of the specification I mentioned about the block dropping when the strain on it was released, and that it was being constantly strained and then released. The block often drops so that when the strain comes upon it the trip line 13 lifts against the clevis and the spliced eye ends 58 before it comes to a riding position upon the block sheave 59. To prevent this very damaging action, manufacturers use various means, some of which have been made the subject of patents. One of these devices 60, called a guard, shown in Fig. 8, and with the arrangement set out in Fig. 9, is hinged on the hinge pin 19 so that the trip line 13 may be removed from the block. Since my crosshead 22 spans the sheave 59 in a similar manner, it serves the purpose of a guard also. This is another object of my invention. The elimination of parts and hence weight is a very important thing in logging equipment. In Fig. 4, where the depending type of crosshead is shown the same may be widened out over the sheave 59 to present the broader area shown in Fig. 2.

In use, as shown in Figs. 1, 2, and 3, the block is held in a substantially flat horizontal working position by what might be termed two spaced arms (the strap ends) which work free and independent of one another and whose median line 46 is also the median line of the sheave groove when the sheave is under working strain, in other words, the median line of each will lie in the same plane, or in still other words, the strap, interconnection, and block, are in consecutive axial alignment under strain.

It is quite evident, without illustration, that the ends of the crosshead 22 which project beyond the sides 39 and 40 of the lower tie member 23 (see Figs. 2 and 3) may be eliminated and the clevis 18 hooked over to straddle said tie member 23 and then connected to the block ears in the usual manner.

I have shown and described my invention so that anyone skilled in the art may apply or adapt the basic idea to meet his conditions, and while I am particularly interested in the application of my invention to logging I do not limit it to that particular use or to the particular forms shown and described because they may be changed considerably in their application to different blocks without departing from the substance matter of the claims.

What I claim is:

1. In a device for hanging a trip line corner block to an anchorage, the combination of a wire rope strap having a thimble on each end thereof; an interconnection which includes a pair of chambered portions formed to receive the thimbled strap ends to form a loop with said strap to encircle the anchorage, a tie member positioned between the lower ends of said chambered portions to hold them apart to form an open space therebetween above said tie member, and a tie portion between the upper ends of said chambered portions bridging said open space and formed to constitute a hand grip for carrying said interconnection; and a block provided with means for securing said block to the tie member; said strap, interconnection, and block, being in consecutive axial alignment under strain.

2. In a device for hanging a trip line corner block to an anchorage, the combination of a wire rope strap having a thimble on each end thereof; an interconnection which includes a pair of chambered portions having entrance thereto relative to the sides thereof for the reception of the thimbled strap ends to form a loop with said strap to encircle the anchorage, a tie member positioned between the lower ends of said chambered portions to hold them in spaced apart relation, and a crosshead extending from the sides of said tie member at right angles thereto; and a block provided with ears attached to said crosshead; said strap, interconnection, and block, being in consecutive axial alignment under strain with the strap end entrances facing and behind the block ears.

3. In a device for hanging a trip line corner block to an anchorage, the combination of a wire rope strap having a thimble on each end thereof; an interconnection which includes a pair of chambered portions formed to receive the thimbled strap ends to form a loop with said strap to encircle the anchorage, and a tie member positioned directly between the lower ends of said chambered portions to hold them apart to form an open space therebetween above said tie member, and a tie portion between the upper ends of said chambered portions bridging said open space and formed to constitute a hand grip for carrying said interconnection, and a crosshead depending directly from the bottom of the tie member at right angles thereto; and a block having ears attached to said crosshead; the strap, interconnection, and block, being in consecutive alignment with their median lines in the same plane when the block is under strain.

JESSE W. FORRESTER.